May 16, 1961  E. W. E. KAMM  2,984,106
FUEL SUPPLY APPARATUS
Filed March 24, 1958
2 Sheets-Sheet 1
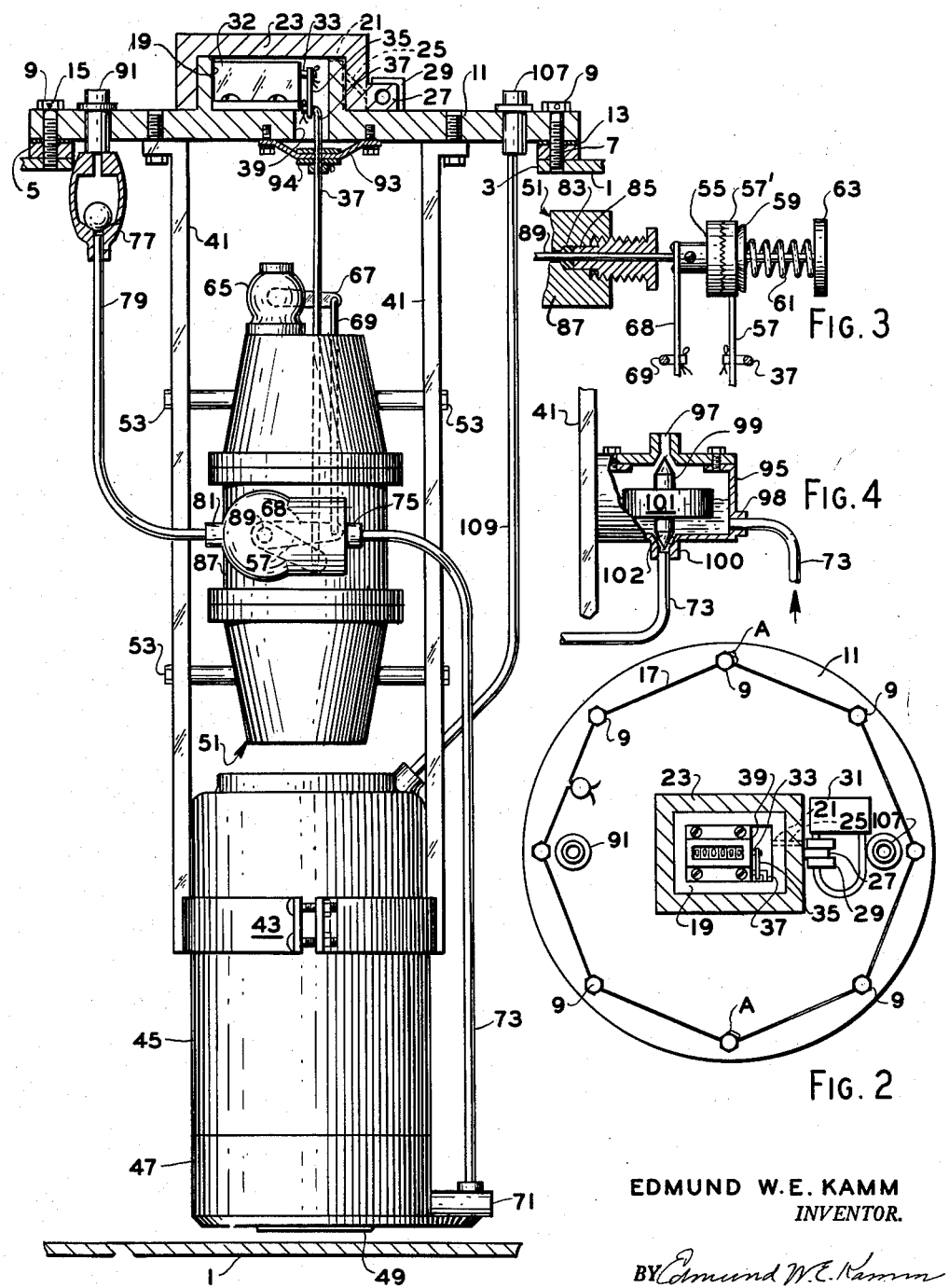
EDMUND W. E. KAMM
INVENTOR.
BY *Edmund W. E. Kamm*

May 16, 1961 E. W. E. KAMM 2,984,106
FUEL SUPPLY APPARATUS
Filed March 24, 1958 2 Sheets-Sheet 2
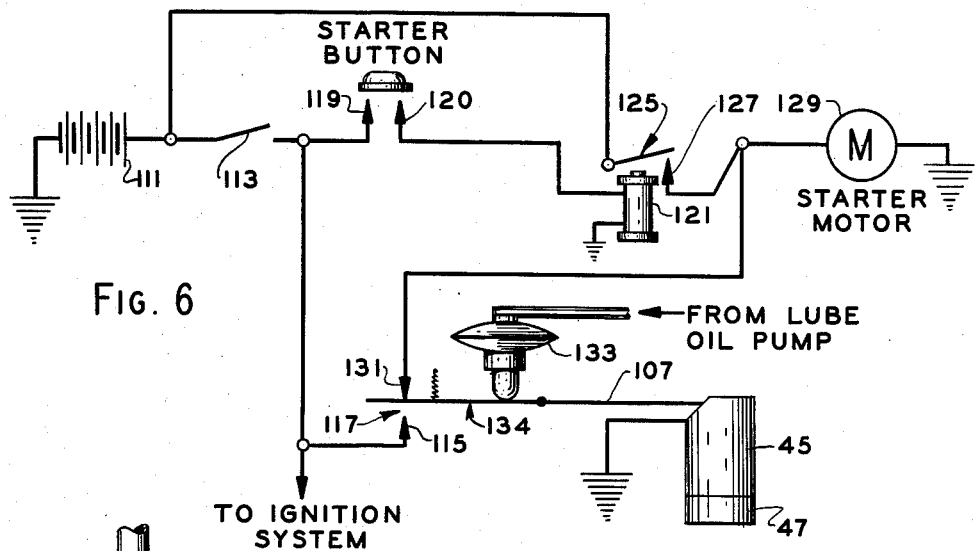
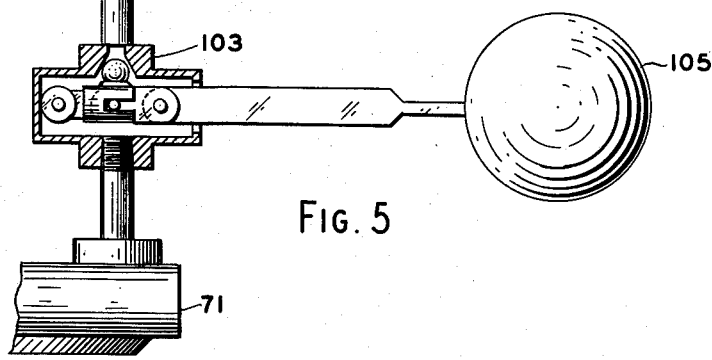
EDMUND W. E. KAMM
*INVENTOR.*
BY *Edmund W. E. Kamm*

United States Patent Office 2,984,106
Patented May 16, 1961

2,984,106
FUEL SUPPLY APPARATUS
Edmund W. E. Kamm, Fort Wayne, Ind., assignor to Tokheim Corporation, Fort Wayne, Ind., a corporation of Indiana
Filed Mar. 24, 1958, Ser. No. 723,343
20 Claims. (Cl. 73—198)

This invention relates to a fuel supply apparatus which is adapted for use on automotive vehicles and particularly for use on transport vehicles. In a modified form it is also applicable to fuel supply systems for heating purposes and other installations in which it is desired to secure an accurate, continuous indication of the amount of fuel being used.

For a long period of years, a need has existed for a fuel supply system for trucks and tractors which are used to haul loads for long distances. Such vehicles are commonly fueled at the starting terminal and are refueled a number of times at public filling stations along the route. At such fuel stops, the vehicle driver either pays for the fuel purchased and receives a receipt therefor or the transport company may be billed by the service station operator.

In either case it is rather common practice for the station operator to issue bills or receipts for more fuel than is actually dispensed.

Attempts have been made in the past to apply meters to the fuel lines leading to the engine of the vehicle without success because various methods were employed by those profiting from the refueling transactions to "beat the meter." One meter for this service is disclosed in the patent to H. L. Blum, No. 2,265,508, issued December 9, 1941.

One method employed was to physically damage the meter and render it inoperative. Since the meter was usually mounted in the engine compartment or in some other location where it was readily accessible to anyone who cared to approach the vehicle and where it could be conceivably struck by flying stones etc., the damage could not be attributed definitely to any particular person.

Since damage to the meter would often prevent the operation of the vehicle, other methods were also employed to achieve the desired result.

For example the pipes to the meter would be disconnected and an air hose would be applied. Since the meter would operate on air pressure, the register could be advanced sufficiently to cover the fictitious amount of fuel so that the meter readings and the bills or receipts would check.

Another method used was to break the glass window of the counter and advance the counter wheels manually to the desired reading. This was possible because the meter output shaft was an oscillating shaft and this required the counter to be ratchet driven.

The cost of detection and prosecution of offenders was so great that this procedure could not be adopted as a standard business practice. The cost in damaged meters was also great and as a result the use of meters was abandoned even though the meter itself was an accurate and operative instrument.

In any property protection or theft prevention problem, it is axiomatic that complete protection or prevention cannot be achieved because a wrongdoer who is determined to perpetrate an undesirable act can achieve his purpose by one method or another. About the best that can be done is to increase the difficulties which must be overcome by such a person, increase the time and equipment which he requires to successfully attain his objective and to compel him to create evidence, in the process of his operations, which will help to identify him as the perpetrator of the wrongful act with sufficient certainty to convict him with a minimum of detective effort.

It is therefore the primary objective of the apparatus disclosed herein to achieve the ends just described in connection with a fuel supply system for automotive vehicles.

Other objects will become apparent from a study of this specification and the drawings which are attached hereto, made a part hereof and in which:

Figure 1 is an elevation, with parts in section of a pump, meter and register apparatus which is mounted within a vehicle fuel tank.

Figure 2 is a top plan view of the apparatus of Figure 1 with the register chamber lid cut away.

Figure 3 is an elevation partly in section showing the dual resister drive mechanisms and the slip clutch in one of them.

Figure 4 is a vertical, sectional view of an air release.

Figure 5 is an elevation partly in section of a float actuated valve.

Figure 6 is a schematic wiring diagram.

Referring to Figures 1 and 2, numeral 1 represents a vehicle fuel tank which has a relatively large top opening 3, surrounded by a flange 5 which is provided with tapped holes 7. The tank which is otherwise a closed tank is usually vented to atmosphere through the fill cap (not shown). A cover 11 rests on a gasket 13 disposed on the flange and screws 9 enter holes 7, through the cover and gasket.

The cover is made of a tough impact resistant material such as cast or plate steel or stainless steel.

To provide evidence of unauthorized removal of the cover, the heads of screws 9 may be drilled at 15 to receive a leaded seal wire 17 of the usual type. Additionally or as an alternative to the use of the seal, one or more of the screw heads may be welded directly to the cover as at A, so that they must be sawn or chipped before the cover can be removed, an operation which would be necessary only very infrequently in the life of the apparatus.

An open topped, relatively thick walled receptacle 19 is provided on the exterior surface of the cover. This receptacle may be formed integral with the cover if the latter is cast, it may be built up by welding suitable pieces of plate together and to the cover or it may be a separate receptacle which is fastened to the cover by fasteners which are accessible from the interior of the tank.

A locking member 29 of U-shaped cross section is cast on or welded to the cover adjacent the receptacle with its legs extending upwardly but spaced slightly from said receptacle.

A cap 23 is made to fit slidingly over the receptacle preferably so that it rests on the cover. It is provided with a laterally extending lug 27 which is adapted to be received between the legs of the member 29. Both the legs and the lug are drilled to receive the bolt of a padlock 31. The padlock is preferably a heavy duty type which is difficult to destroy or pick.

As shown in Figures 1 and 2, one wall of the cap is received between the corresponding wall of the receptacle and the legs of the member 29 which are spaced slightly from the exterior of the cap. The top and exterior surfaces of this receptacle side wall are grooved at 21 and the adjacent wall of the cap is provided with an inwardly and upwardly slanting vent hole 25 which intercepts the groove in the receptacle side wall so as to provide, with said groove, a vent for the receptacle. The hole 25 is preferably disposed behind one of the legs of member 29 when the cap is in place so as to be concealed by it and make it difficult to plug, either accidentally or deliberately.

A register 32 is mounted within the receptacle and has a shaft 33 to which is fixed a lever 35. The free end of the lever is connected to a link 37 which extends downwardly through an opening 39 in the cover, within the receptacle. The register is preferably of the non-resettable, ratchet driven type in which the lowest order indicator is advanced 1/10 of a revolution for each full cycle oscillation of the lever 35.

A pair of supports 41 are fixed to the bottom side of the cover and depend therefrom through opening 3, in substantially parallel, diametrically spaced relation, and carry, at their lower ends, clamping means 43 which are adapted to support a motor-pump unit 45—47. The pump inlet 49 is in spaced relation with respect to the bottom of the tank. This motor-pump unit may be substantially like that disclosed in the application Serial Number 701,047, filed by Wright et al. on December 6, 1957, now Patent No. 2,947,259, although any other suitable unit may be employed.

A meter 51 which may be of the type disclosed in the Blum patent mentioned above or any other suitable device, is mounted on the supports 41, above the motor-pump unit, by means of screws 53. The meter comprises reciprocating pistons which are actuated by the fuel pumped to them by pump 45 and is provided with a shaft 89 which is rotatably oscillated through a predetermined arc as the pistons reciprocate. As shown in Figure 4 of Blum and Figure 3 hereof, shaft 89 is passed to the exterior of the meter case 87 through a stuffing box 83—85. The shaft extends therebeyond and has the driving member 55 of a yieldable clutch fixed to it. A lever 57 is rotatably mounted on the shaft and its hub 57′ serves as the driven member of the clutch. A spring seat 59 is disposed coaxially on the shaft adjacent the lever and a spring 61 is compressed between the seat and a collar 63 fixed to the end of the shaft so as to urge the clutch members into engagement with a predetermined force. If desired, the clutch surfaces may be serrated as shown in Figure 3.

The free end of lever 57 is perforated to receive the bent end of link 37 which transmits the oscillations of lever 57 to lever 35 to drive register 32.

As is shown in Figure 1, a fluid motor in the form of a diaphragm 93 has its peripheral rim attached to the bottom side of the cover 11, is centered on the link 37 and covers the opening 39. This hub member 94 of the diaphragm is adjustably mounted on the link 37 and is adapted to contact the bottom of the cover to limit the upward travel of the link 37 and its associated parts.

In the event that it becomes desirable to provide a second register in the fuel tank itself to provide a check for the register 32, such a register 65 may be mounted on the meter or in any other suitable manner and its actuating lever 67 may be connected by a link 69 to a second arm 68 which is fixed directly to the driving clutch member 55 which in turn is fixed to the meter shaft 89.

The meter and register 65 are made of materials which will not deteriorate when subjected to wetting with fuels of the type used or when subjected to the fumes thereof. They will continue to operate despite the fact that they will be submerged in the fuel when the tank is full.

The pump 45 has a discharge fitting 71 which is connected with the inlet 75 of the meter by a conduit 73 which may be plastic tubing, hose or metal tubing. The meter outlet 81 is connected by a similar conduit 79 to a check valve 77 of any suitable construction, here shown as a ball valve, and this valve is connected to direct fuel passing through it to a discharge fitting 91 which is mounted on the cover. The fitting is connected to the carburetor or other apparatus which feeds fuel to the engine by the usual tubing (not shown).

While the check valve is shown, it may not be required in all applications of the apparatus.

It may also be necessary, when the pump 45 is a positive displacement type unit such as a gear or blade pump instead of a centrifugal or turbine type, to provide an air separator in the discharge line 73. Such a device is shown in Figure 4 and comprises a chamber 95 having a side inlet 98, a bottom outlet 100 and a vent port 97, shown as communicating with the chamber at one end and with the interior of the tank 1 at the other end. The port would normally be connected to atmosphere but this is not preferred because the device could be rendered useless by plugging the vent and further any fuel which might be discharged through the vent could create a fire hazard.

A float, such as a cork 101 carries valves 99, 102 and serves to raise the valves to close the port 97 and open outlet 100 when a suitable liquid level is maintained in the chamber and to open the port 97 and close the outlet 100 when the liquid level falls.

The motor 47 is supplied with electric current from the battery of the vehicle, through the cable 109 and the connector 107 mounted on the cover 11. The circuit by which current is supplied to connector 107 is shown in Figure 6 in which the battery 111 feeds the usual key switch 113 on the dash board of the vehicle. This switch is connected to supply the ignition system and contact 119 of the starting switch, the other contact 120 of which is connected to the coil 121 of the starting relay. A separate wire is usually connected from the battery to one of the contacts 125 of the relay while the other relay contact 127 is connected to the starting motor 129.

The contact 127 is also connected to one contact 131 of a double throw switch 117. The second contact 115 of this switch is connected to the output side of the key switch 113. The moving blade 134 of switch 117 is connected to the fuel pump motor 45 through line 107 and is normally held in position to engage contact 131 by a suitable spring or the like. A fluid motor 133 is connected to the discharge side of the engine lube oil pump so that when the engine is started, the pressure developed by this pump will swing the movable element of switch 117 from contact 131 to 115 and hold it there so long as the engine runs.

*Operation*

In the normal operation of the apparatus disclosed above, the vehicle operator will close switch 113. This will energize the ignition apparatus and contacts 115 and 119. Motor 45 of the fuel pump will not start however until the starting button is pushed to close contacts 119, 120. This energizes the relay coil 121 which closes contacts 125, 127 to energize the starting motor 129 which cranks the engine. Switch 125, 127 also closes a circuit through contact 131, blade 134, line 107, to the motor 45 so that the fuel pump 47 is started and will supply fuel to the engine.

When the engine starts, lube oil pressure will be built up in fluid motor 133 which moves blade 134 to contact 115. The operator releases the starting button so as to deenergize relay coil 121 and consequently the cranking motor, but the fuel pump motor will now be held energized from the key switch through the contact 115 and blade 134. As soon as switch 113 is opened, both the ignition and fuel pump motor circuits will be opened.

As soon as the fuel pump starts, fuel will be delivered under pressure to the meter and from the meter to the check valve 77, discharge fitting 91 and to the engine. As the meter pistons reciprocate to meter the fuel, the lever 57 will oscillate, will reciprocate link 37 which in turn oscillates the lever 35 of the register 32. The meter is so designed that one cycle of the pistons displaces 1/10 of a gallon of fuel and this displacement is registered on the lowest order register wheel of register 32. It is of course obvious that meters of different displacement may be used and that by suitable gearing may be inserted in the register drives to cause them to register the displacement properly. If the second register 65 is used, it will also be advanced in the same manner by levers 68, 67 and link 69.

The fuel tank is usually filled at the company terminal before the vehicle starts on its trip and the cap 23 may be removed by an authorized person who has possession of the key for lock 31, and the reading of the register 32 will be noted on the records. The cap is replaced and relocked. The driver of the vehicle secures receipts for all gasoline purchased for refueling until it is returned to its home terminal or until it reaches the terminal at destination where the tank is refilled. An authorized person at this terminal will take a second reading. The difference between the second and first readings yields the actual quantity of fuel consumed and this quantity should be substantially the same as the sum of the quantity represented by the purchase receipts and the quantity required to refill the tank at the final terminal.

In case the check is to be made at the terminal of destination, the initial reading may be written directly upon the driver's log or it may be sent to such terminal via teletype, phone, etc. along with other data which regularly passes between terminals or both.

If anyone wishes to physically damage the meter, he must first somehow remove the screws 15. If a seal wire is used this must be broken. If some of the screws are welded to the cover, he must saw or chip them free and in doing so he will leave obvious evidence of such operations which together with a damaged meter which is disposed within an undamaged fuel tank, constitutes evidence which could well lead to conviction of the person for malicious destruction of property if nothing else. In addition, prior records of the fuel consumption per mile of the same vehicle would, with the above evidence, support a charge of embezzlement if the gasoline receipts turned in materially exceed the usual consumption.

To tamper with the register 32 it is necessary to either pick or break the lock 31, and even then if the register is advanced in any manner, this will not affect the register 65 which is independently driven by the meter through arms 67, 68 and link 69. This register can be read by taking the pump and meter out of the tank. Since the registers are started initially from the same reading, usually zero, and are operated simultaneously so long as the system is operated properly, any variance between them is indicative of improper manipulation.

If an attempt is made to advance the register readings so as to cover fictitious receipts by blowing air into the discharge fitting 91, such will be foiled by the check valve 77.

Any attempt to advance the register readings by blowing air into the fuel tank through a plug in the fill pipe will elevate the pressure in the tank, the fuel remaining in the tank above the level of the highest pump inlet will first be discharged through fitting 91 and must be disposed of in some manner. If the fuel discharge line is disconnected, the fuel will first be discharged and thereafter air will be forced through the meter. In both instances the meter will operate and advance the register 65 which is directly driven by the meter, however, the pressure in the tank will raise the diaphragm 93 to its extreme upper position, as determined by contact between hub 94 and the cover 11, and will hold it there, since the upper side thereof is vented to atmosphere through ports 21, 25 and through the joints between the receptacle 19 and cap 23. Thus the register 32 cannot be advanced because the clutch 55 will slip. When the pressure is released from the tank and the meter is again operated in a normal manner, the clutch will again slip on the first upstroke of the lever 57 and the register drive will again be brought into proper synchronism with the meter shaft. Thus the register will lose, at a maximum, one meter cycle or 1/10 gallon and will therefore still display a reasonably accurate account of the fuel actually consumed.

There is a further obstacle to this type of manipulation in that the registers are concealed from the person performing this operation unless he also breaks the lock 31 and he, therefore, does not know how far he has advanced the register by the air method, and he will still have to explain the fact that the readings of registers 32, 65 and the fuel receipts do not correspond.

Should the pump 45 be a positive displacement pump, it might be possible to disconnect the fuel line at 91 and merely by operating the fuel pump in the normal manner, pump enough air through the meter to advance the registers. This must again be done blindly and the tank must be pumped out before air can be pumped.

Such pumping of air can be prevented by inserting an air release such as that shown in Figure 4 in the line 73. This device responds to an influx of air by a lowering of the float 101 which opens vent valve 97–99 and closes the discharge 100 to the meter and stops the meter so that the registers cannot be advanced.

A similar operation can be carried out by circulating liquid through the pump, tank and meter. This operation is again done without access to the register unless the lock is broken and the register readings will not correspond with the fuel receipts.

There is a second deterrent to both of the last mentioned procedures which will be obvious from a study of the wiring diagram (Fig. 6).

It will be recalled that each of the last named methods involved opening the fuel line and fuel cannot therefore be supplied from the pump to engine at a sufficient pressure to keep it operating and, as was explained above, the motor pump unit 45, 47 is operated through the key switch only if the fluid motor 133 is pressurized by the engine lube oil pump which is operative only when the engine is running.

Accordingly, the only way in which the operator can keep the fuel pump running through operation of the mechanisms on the truck, is to keep the starter button depressed which results in cranking the engine. Thus the battery will be drained by the heavy cranking load before much fuel can be withdrawn.

There are of course other things which can be done to energize motor 45 without energizing the starting motor but these methods require both a knowledge of the vehicle wiring system, the fuel system and also require additional equipment to perform, so that they become difficult, obvious and time consuming. Thus the chances of being caught red-handed by a police patrolman or a transport company roving inspector are greatly increased.

There is always the fact that the register must either be broken into or must be advanced blindly so that in either case the company officials will be put on notice and the particular driver can be watched and caught, on a subsequent trip.

*Modification*

With respect to the methods which utilize either pumping air through the meter with the fuel pump or forcing compressed air through the meter in the normal direction, it is possible to use a float actuated valve 103, such as that shown in figure 5, mounted on the pump discharge 71 either with or without the air release of Figure 4. The float 105 is arranged so that it will close the valve 103 and the discharge line 73 when the liquid level in the tank has been lowered so that it is about to admit air to the pump. The valve being closed under such conditions, prevents passing air through the meter and insures that the meter will always be full of liquid and will meter accurately whenever liquid is forced through it.

It will thus be seen that the apparatus disclosed herein, while it does not prevent a determined manipulator from "beating the meter" does make it more difficult and risky for him to accomplish his purpose. The manipulator is compelled to leave some evidence of his operation and these factors, of themselves, will discourage the majority of those who indulge in the practice because it is easy and can be quickly accomplished with little risk of apprehension. The remaining few can be policed and dealt with by suitable measures, if they persist, without great expense such as would be incurred by having to police all of the drivers.

The same general problems have been faced in the past by urban transit companies in connection with fare collections and have been successfully solved by application of measures which are similar, in principle, to those stated herein.

The apparatus disclosed herein, simplified so that it comprises essentially merely the motor-pump unit, meter and register 32 can be readily used in the fuel tanks of oil burner fuel supply systems to provide a running record of the heating oil consumption. The housing of the pump, motor and meter in the tank affords pretection for them against physical damage, reduces the amount of exposed piping required to make the installation, prevents the loss of fuel through leakage from these units and the connecting piping since such leakage, if it occurs, is retained in the tank. The customer is thus provided with a record which enables him to check the bills furnished to him by the fuel distributor. For example, if he starts with a full tank and takes the meter reading at the start and at the time that a new delivery is made, the difference in readings should equal the gallonage for which he is billed on refueling.

Other uses will be apparent such as, for example, dispensing bulk lube oils, radiator antifreeze etc., in which it would be helpful to have automatic recording of total quantities dispensed to assure proper control of inventories of these items.

It is obvious that various changes may be made in the form, structure and arrangement of parts of the specific embodiments of the invention disclosed herein for purposes of illustration, without departing from the spirit of the invention. Accordingly, applicant does not desire to be limited to such specific embodiments but desires protection falling fairly within the scope of the appended claims.

I claim:

1. A liquid supply apparatus comprising in combination, a normally closed, vented, liquid supply tank, a submersible motor and pump, said pump having a liquid inlet and a discharge conduit, a liquid meter having an inlet and an outlet, means for mounting said motor, pump and meter within said tank, a discharge fitting mounted on said tank, a volume register supported by said tank and means for connecting said register for operation by said meter, conduit means connecting said pump discharge conduit with said meter inlet and additional conduit means connecting said meter outlet with discharge fitting so as to supply metered liquid under pressure thereto.

2. The structure defined by claim 1 which includes a check valve disposed in said additional conduit means and within said tank so as to prevent flow from said discharge fitting to said meter.

3. The structure defined by claim 1 which includes means disposed in said first named conduit means for preventing the passage of air to said meter.

4. The structure defined by claim 1 which includes means responsive to superatmospheric pressure in said tank for preventing the operation of said register by said meter.

5. The structure defined by claim 1 which includes means for mounting said register for visibility from the exterior of said tank, means mounted for movement to conceal and display said register and means for preventing an unauthorized movement of said last named means to display said register.

6. The structure defined by claim 1 which includes a second register, means for connecting said second register for operation by said meter and means for mounting said register within said tank so as to be not visible from the exterior of the tank.

7. The structure defined by claim 4 wherein the register connecting means includes yieldable means to permit operation of said meter while said register is prevented from operation.

8. The structure defined by claim 6 wherein the first register connecting means includes a yieldable clutch and said second register connecting means continuously drives said second register and which includes means responsive to superatmospheric pressure in the tank for preventing actuation of said first register by said clutch.

9. The structure defined by claim 3 wherein said preventing means includes a liquid level responsive valve means connected in said pump discharge conduit and disposed so as to close said conduit before the liquid level in said tank falls below said pump inlet.

10. A liquid supply apparatus comprising in combination, a vented liquid supply tank defining a relatively large opening, a cover removably mounted to close said opening, a submersible motor, pump and a meter mounted on said cover so as to depend therefrom inside of said tank when the cover is in place thereon, means for holding said cover in place, including means for indicating that the cover has been removed, a discharge fitting on said cover, means connecting the pump to deliver liquid from the tank to the meter, means connecting said meter to deliver measured liquid to said fitting, a register mounted on said cover so as to be visible from the exterior of the tank, movable means on said cover for concealing said register, means for preventing unauthorized moving of said movable means, and means connecting said meter to drive said register.

11. The structure defined by claim 10 which includes a vent in said cover, a fluid motor including a movable member connected with said meter and register connecting means and having one side communicating with the vent and the opposite side communicating with said tank, said fluid motor serving to hold said register against operation when said tank is pressurized, said register drive means including yieldable means to permit operation of said meter while said register is held inoperative by said motor.

12. The structure defined by claim 11 which includes a second register disposed within said tank so as not to be visible from the exterior thereof and means for continuously driving said second register from said meter.

13. The structure defined by claim 10 which includes means disposed in said tank for preventing the flow of fluid through said discharge fitting to said meter.

14. The structure defined by claim 10 which includes means for preventing the flow of gas through said meter and to said fitting.

15. A liquid supply apparatus in combination with a fuel burning engine, comprising a normally closed, vented, liquid supply tank, a submersible motor and pump and a liquid meter mounted within said tank, a register, means connecting said meter to drive said register, means connecting said pump to supply liquid to said meter, means connecting said meter to supply measured liquid to said engine, a source of electric power and means operable only simultaneously with said engine for energizing said motor.

16. The structure defined by claim 15 which includes means for preventing the passage of fluid in a reverse direction through said meter.

17. The structure defined by claim 15 which includes means for preventing air from passing from said tank through said meter.

18. The structure defined by claim 15, which includes means responsive to superatmospheric pressure in said tank for stopping said register, said register connecting means including yieldable means for permitting operation of said meter while said register is stopped.

19. The structure defined by claim 18 which includes means for preventing the flow of fluid reversely through said meter.

20. The structure defined by claim 18 which includes a second register mounted in said tank and means connecting said meter to continuously drive said second register.

References Cited in the file of this patent

UNITED STATES PATENTS

| | | |
|---|---|---|
| 974,756 | Diescher | Nov. 1, 1910 |
| 1,722,653 | Banning | July 30, 1929 |
| 2,174,424 | Nall | Sept. 26, 1939 |
| 2,361,747 | Curtis et al. | Oct. 31, 1944 |
| 2,652,720 | Piety | Sept. 22, 1953 |
| 2,885,025 | O'Dell | May 5, 1959 |